United States Patent
Menonna et al.

(10) Patent No.: US 9,222,374 B2
(45) Date of Patent: *Dec. 29, 2015

(54) CAMSHAFT AND ASSOCIATED CAM

(75) Inventors: Antonio Menonna, Ditzingen (DE); Falk Schneider, Korntal-Münchingen (DE); Stefan Steichele, Gerlingen (DE); Thomas Flender, Eberdingen (DE); Michael Kreisig, Stuttgart (DE)

(73) Assignee: Mahle International GmbH (DE)

( * ) Notice: Subject to any disclaimer, the term of this patent is extended or adjusted under 35 U.S.C. 154(b) by 98 days.

This patent is subject to a terminal disclaimer.

(21) Appl. No.: 13/554,821

(22) Filed: Jul. 20, 2012

(65) Prior Publication Data
US 2013/0019824 A1  Jan. 24, 2013

(30) Foreign Application Priority Data
Jul. 21, 2011  (DE) .................. 10 2011 079 584

(51) Int. Cl.
*F01L 1/04* (2006.01)
*F01L 1/047* (2006.01)
*B23P 11/02* (2006.01)

(52) U.S. Cl.
CPC .............. *F01L 1/047* (2013.01); *B23P 11/025* (2013.01); *B23P 2700/02* (2013.01); *F01L 2001/0471* (2013.01); *F01L 2001/0475* (2013.01)

(58) Field of Classification Search
CPC .............. F01L 1/047; F01L 2001/0471; F01L 2001/0475; B23P 11/025; B23P 2700/02
USPC ................. 123/90.6, 90.16; 29/888.1
See application file for complete search history.

(56) References Cited

U.S. PATENT DOCUMENTS

| | | | | |
|---|---|---|---|---|
| 4,616,389 A | * | 10/1986 | Slee | .................... 419/8 |
| 4,630,498 A | * | 12/1986 | Santi | ................ 74/445 |
| 5,272,930 A | * | 12/1993 | Nakamura et al. | ............... 74/434 |
| 6,438,836 B1 | | 8/2002 | Barth et al. | |
| 6,473,964 B1 | * | 11/2002 | Anderson et al. | ............ 29/888.1 |
| 8,474,136 B2 | * | 7/2013 | Bechtold et al. | ............. 29/888.1 |
| 2007/0006834 A1 | | 1/2007 | Schmid | |
| 2008/0222889 A1 | | 9/2008 | Asbeck et al. | |

FOREIGN PATENT DOCUMENTS

| | | |
|---|---|---|
| DE | 4326768 A1 | 2/1995 |
| DE | 10230542 A1 | 1/2004 |
| DE | 10358351 A1 | 7/2004 |
| DE | 102004011815 A1 | 9/2005 |

(Continued)

OTHER PUBLICATIONS

Decker, K.H.: Maschinenelemente: Gestaltung und Berechung. 8. Aufl. Munchen, Wien, Carl Hanser Verlag, 1982. Sieten 26, 27 und 124 bis 127-ISBN 3-446-13558-8.

(Continued)

*Primary Examiner* — Ching Chang
(74) *Attorney, Agent, or Firm* — Fishman Stewart Yamaguchi PLLC

(57) ABSTRACT

A camshaft for a combustion engine has a shaft and at least one cam thermally joined to a joining surface on the shaft side via a joining surface on the cam side. The shaft is embodied as a drawn and not additionally worked tube. Because of this the production of commercial vehicle camshafts can be realized in a more cost-effective manner since these do not have to be additionally ground or turned.

9 Claims, 1 Drawing Sheet

(56) References Cited

FOREIGN PATENT DOCUMENTS

| DE | 102007023087 | A1 | | 3/2008 |
|---|---|---|---|---|
| DE | 102007012756 | A1 | | 9/2008 |
| DE | 102009018407 | A1 | * | 10/2009 |
| DE | 102008046167 | A1 | | 3/2010 |
| DE | 102009060352 | A1 | | 6/2011 |
| GB | 2391274 | | | 2/2004 |
| WO | WO 2010142266 | A1 | * | 12/2010 |

OTHER PUBLICATIONS

German Search Report for DE-102077079584.7.
English abstract for DE-4326768.
English abstract for DE-10358351.
English abstract for DE-102007023087.
English abstract for DE-102008046167.

* cited by examiner

CAMSHAFT AND ASSOCIATED CAM

CROSS-REFERENCES TO RELATED APPLICATION

This application is a National Stage application which claims the benefit of German Patent Application No. 102011079584.7 filed on Jul. 21, 2011, which is hereby incorporated by referenced in its entirety.

TECHNICAL FIELD

The present invention relates to a camshaft and to a cam for such a camshaft.

BACKGROUND

Camshafts are a fixed part of many combustion engines. There, the camshaft comprises a shaft which is joined to at least one cam. For joining the shaft and the cam, thermal joining methods are employed as a rule. There, the connection of the shaft and the cam is ensured by way of a joining surface on the cam side, which as a rule is arranged in a cam bore, and a joining surface on the shaft side. Disadvantageous here is that the moment that can be transmitted via the camshaft is limited by the friction between the joining surface on the cam side and the joining surface on the shaft side.

The present invention therefore deals with the problem of stating an improved or at least alternative embodiment for a generic camshaft, which is characterized in particular by a simplified manufacturing method.

According to the invention, this problem is solved through the subjects of the independent claims. Advantageous embodiments are the subject of the dependent claims.

SUMMARY

The present invention is based on the general idea of embodying a shaft of a camshaft as a precision-drawn but not additionally reworked, for example ground type. Through the omission of the previously required turning or grinding operation, the camshaft according to the invention can be produced altogether more cost-effectively.

The tolerance that is present on the outer diameter should not exceed 0.07 mm, so that an associated cam can be produced with the same tolerance with respect to its cam bore as before and despite this can be connected to the shaft in a fixed manner by means of a shrink fit.

With an advantageous further development, a joining surface on the cam side of a cam of the camshaft and alternatively or additionally a joining surface of the drawn shaft on the shaft side are provided with a predefined roughness. The cam and/or the shaft are thus designed so that surfaces interacting with the cam through the connection of the shaft, i.e. the joining surface on the cam side and the joining surface on the shaft side, each or individually have a predefined roughness. Here, the invention utilises the knowledge that a friction responsible for the connection and thus for the cohesion of the shaft to the cam between the joining surface on the cam side and joining surface on the shaft side can be increased in that the joining surface on the cam side and/or the joining surface on the shaft side are roughened up. By increasing the friction between the two joining surfaces, the connection between the shaft and the cam is thus reinforced and because of this the moment that can be transmitted by the camshaft, increased.

With a further embodiment of the solution according to the invention, the joining surface on the cam side has a roughness which is produced by a blasting method. Alternatively or additionally, the joining surface on the shaft side has a predefined roughness, which is also produced through a blasting method. As a blasting material during the blasting method for roughening up the joining surface on the cam side and/or the joining surface on the shaft side, broken glass or broken glass fragments are preferentially employed. Further advantageous forms of the blasting material are casting particles as well as corundum. A blasting material consisting of a mixture of the aforementioned blasting materials as well as of other particle-shaped blasting materials and any other mixtures are also conceivable.

With a further preferred embodiment of the invention, the joining surface on the cam side and/or the joining surface on the shaft side is/are roughened up by means of an optical method. The joining surface on the cam side and/or the joining surface on the shaft side are thus roughened up for example by means of a laser. Joining surfaces on the cam side and/or joining surfaces on the shaft side are also conceivable, which are roughened up by means of a chemical, in particular through etching.

It is pointed out that camshafts, comprising a plurality of such cams, i.e. cams with a predefined roughness of the joining surface on the cam side and/or a predefined roughness of the associated joining surface on the shaft side, are likewise part of the scope of this invention. Here, not all joining surfaces on the cam side or all joining surfaces on the shaft side necessarily have to have such a roughness. Embodiments are conceivable, wherein in each case one of the interacting joining surfaces or both interacting joining surfaces of at least one joining surface are roughened up.

Such camshafts or cams and/or shafts in this case are preferentially produced with the method for the different embodiments of the method exemplarily described in the following:

With such a method, the joining surface of a cam, i.e. the joining surface on the cam side and/or the joining surface of the shaft, i.e. the joining surface on the shaft side is practically roughened up. Here, a blasting method is employed for example wherein the joining surface on the cam side and/or the joining surface on the shaft side is/are blasted with a blasting material. As blasting material during blasting, broken glass or broken glass fragments are employed for example. In the process, the blasting material is blasted onto the joining surface on the cam side and/or onto the joining surface on the shaft side. Embodiments of the method are also conceivable, wherein the blast is orientated in such a manner that the blast and thus the blasting material graze the relevant joining surface. As alternative or additional blasting materials, casting particles and corundum are exemplarily pointed out here. A mixture of these blasting materials or other blasting materials mixed with these blasting materials can also be used with the blasting method.

With a further preferred embodiment of the method, the joining surface on the cam side and/or the joining surface on the shaft side are specifically roughened up through the use of electromagnetic waves. Here, lasers are preferentially used which make available a high performance and allow great precision. According to a further advantageous variant of the method, the joining surface on the cam side and/or the joining surface on the shaft side are roughened up by using chemicals. In such a chemical method, the relevant joining surface is thus roughened up in particular through etching.

The roughed up joining surface on the shaft side and the roughed up joining surface on the cam side are now connected to each other through a thermal joining method according to an advantageous variant of the method. A shrink fit is pointed out as an example for such a thermal joining method.

In the case of thermal joining methods, a suitable dimensioning of the shaft and of the cam, in particular of a cam bore of the cam, has to be practically ensured. Here, different cams of the camshaft can be connected to the associated shaft through different methods.

It is pointed out that a specific, predefined roughening up of the joining surface on the cam side and/or of the joining surface on the shaft side can also serve the objective through a combination of the method forms described here and a combination of the method forms described here with other method variants and thus be part of the scope of this invention. It is noted, in addition, that the mentioned improvement of the connection between the cam and the shaft and the associated method can be easily transferred to the connection between the shaft with other joined components.

Further important features and advantages of the invention are obtained from the subclaims, from the drawings and from the associated Figure description by means of the drawings.

It is to be understood, that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar of functionally same components.

It shows, in each case schematically.

DETAILED DESCRIPTION

Figure 1:
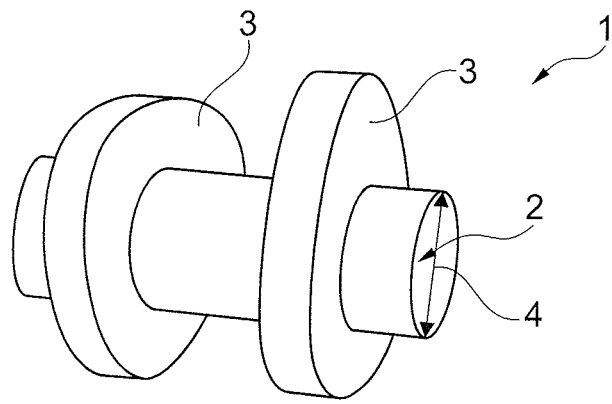
FIG. 1 a perspective view of a camshaft having a shaft and two cams.

According to FIG. 1, a camshaft 1 comprises a shaft 2 as well as at least one cam 3. The embodiment shown here in this case comprises two cams 3 which have an eccentric shape, wherein both cams 3 are embodied identically. The shaft 2 has a cylindrical shape and according to the invention is embodied as an exclusively drawn and not additionally worked tube, wherein an outer diameter 4 of the shaft 2 is slightly larger than a diameter 5 of a cam bore 6 of the respective cam 3 (see FIG. 3). In order to ensure thermal joining of the cam 3 to the shaft 2, the permissible tolerance of the outer diameter 4 on the shaft 2 is preferentially limited to approximately 0.07 mm. Because of this, the cam 3 can be produced with the same tolerance as previously usual standard cams and nevertheless can be fastened to the shaft 2 by means of a simple shrink fit.

Figure 2:
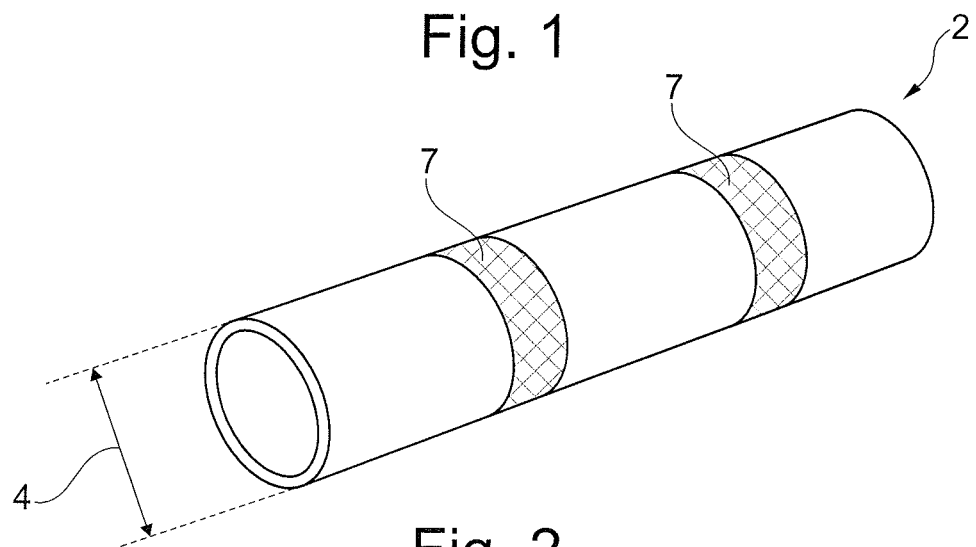
FIG. 2 a perspective view of the shaft.
Figure 3:
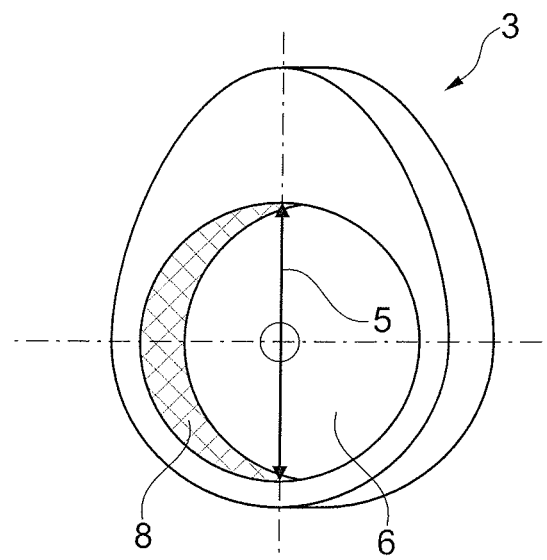
FIG. 3 a view of a cam.

During the thermal joining, the shaft 2 and the cams 3 are joined by way of a joining surface 7 each on the shaft side of the shaft 2 and a joining surface 8 of the cams 3 each on the cam side. As is additionally shown in FIG. 2, the shaft 2 is designed in such a manner that the joining surfaces 7 on the shaft side assigned to the joining surfaces 8 on the cam side have a predefined roughness which is produced through targeted roughening up of these joining surfaces 7. In addition, the cams 3, as exemplarily shown for one of the cams 3 in FIG. 3, are roughed up in the region of their joining surfaces 8.

Thus, the friction between the joining surfaces 7 on the shaft side and the associated joining surfaces 8 on the cam side is increased, which leads to a reinforcement of the connection between the shaft 2 and the associated cam 3. Thus, a moment that can be maximally transmitted by the camshaft 1 is increased, i.e. in particular a torque or an impulse.

However, as a special advantage with the camshaft 1 according to the invention it can be seen that a simple but precision-drawn tube can be used for the shaft 2 without the shaft 2 still having to be reworked, in particular ground or turned. Because of this, these previously required operations can be omitted, as a result of which the camshaft 1 can be altogether produced more cost-effectively. Precision-drawing of the shaft 2 is to mean drawing of said shaft with a predefined maximum tolerance with respect to the outer diameter 4 of in particular 0.07 mm.

In general, the shaft 2 can be designed as solid shaft or as hollow shaft, wherein the term "tube" is not restricted to a hollow shaft, but can also comprise a solid shaft in principle.

The invention claimed is:

1. A camshaft for a combustion engine comprising:
   a shaft;
   at least one cam joined thermally to the shaft that is connected by way of a joining surface on the at least one cam to a joining surface on the shaft;
   wherein the shaft is embodied as a precision-drawn and not additionally worked tube;
   wherein an entire area of both the joining surface on the at least one cam and the joining surface on the shaft has a predefined roughness from blasting; and
   wherein the shaft on an outer diameter and the at least one cam on an inner diameter each has a tolerance of a maximum of +/−0.07 mm.

2. The camshaft according to claim 1, wherein the camshaft is embodied as a commercial vehicle camshaft.

3. The camshaft according to claim 1, wherein a blasting material during blasting of the at least one of the joining surface on the cam and of the joining surface on the shaft comprises casting particles, corundum, broken glass or a mixture thereof.

4. The camshaft according to claim 1, wherein the camshaft is embodied as a commercial vehicle camshaft.

5. The camshaft according to claim 1, wherein an outer diameter of the shaft is greater than a diameter of a bore of the at least one cam.

6. A cam thermally joinable to a shaft for a camshaft comprising:
   a joining surface corresponding to a joining surface on the shaft by which the cam is joinable to the shaft, wherein an entire area of the joining surface on the cam has a predefined roughness from blasting, and wherein an inner diameter of the cam and an outer diameter of the shaft each has a tolerance of a maximum of +/−0.07 mm.

7. The cam according to claim 6, wherein a blasting material during blasting of the joining surface on the cam comprises casting particles, corundum, broken glass or a mixture thereof.

8. A camshaft for a combustion engine comprising:
   a shaft; and
   at least one cam joined thermally to the shaft by way of a joining surface on the at least one cam to a joining surface on the shaft, the at least one cam having an inner diameter with a maximum tolerance of +/−0.07 mm;
   wherein the shaft is embodied as a precision-drawn and not additionally worked tube, and has an outer diameter with a maximum tolerance of +/−0.07 mm; and
   wherein an entire area of both the joining surface on the at least one cam and the joining surface on the shaft has a predefined roughness from blasting; and
   wherein an outer diameter of the shaft is greater than a diameter of a bore of the at least one cam.

9. The camshaft according to claim 8, wherein a blasting material during blasting of the at least one of the joining surface on the cam and of the joining surface on the shaft comprises casting particles, corundum, broken glass or a mixture thereof.

* * * * *